United States Patent
Suzuki et al.

(10) Patent No.: US 6,911,971 B2
(45) Date of Patent: Jun. 28, 2005

(54) COMPUTER AND METHOD PROVIDING FOR ILLUMINATION OF KEYBOARD

(75) Inventors: Michio Suzuki, Yokohama (JP); Tetsuo Ogawa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 10/064,902

(22) Filed: Aug. 27, 2002

(65) Prior Publication Data

US 2003/0038785 A1 Feb. 27, 2003

(30) Foreign Application Priority Data

Aug. 27, 2001 (JP) ........................................ 2001-256785

(51) Int. Cl.$^7$ ................................................ G09G 5/00
(52) U.S. Cl. ........................ 345/170; 341/22; 200/308
(58) Field of Search ................................ 345/168–172; 200/308–317; 341/22, 23, 24, 25, 26; 362/23–30; G09G 5/00

(56) References Cited

U.S. PATENT DOCUMENTS 5,655,826 A * 8/1997 Kouno et al. ................. 362/24
5,743,381 A * 4/1998 Patak et al. .................. 200/310
6,036,326 A * 3/2000 Yoshikawa et al. ........... 362/23

FOREIGN PATENT DOCUMENTS

| JP | 05-314855 | * 11/1993 | .......... H01H/13/02 |
| JP | 09-009106 | * 1/1997 | .......... H04N/5/225 |

* cited by examiner

Primary Examiner—Alexander Eisen
(74) Attorney, Agent, or Firm—Scott W. Reid

(57) ABSTRACT

The computer of the present invention is provided with a main body on which keys to be operated by the user are disposed and a display unit that displays an image in accordance with each operation executed for the main body. Each key disposed on the main body is composed of its body having a key top and a light accumulator recess opened in the key top. The light accumulator recess is formed in a manner indicative of the character or symbol associated with such key. The light accumulator recess has embedded in it a light accumulating material such that the character or symbol associated with the key is illuminated by the residual light emission of the light accumulating material when the computer is operated in a location with little or no ambient light.

18 Claims, 9 Drawing Sheets

COMPUTER AND METHOD PROVIDING FOR ILLUMINATION OF KEYBOARD

FIELD OF THE INVENTION

The present invention relates to a computer that can be operated easily in dimly-lit or dark environments and, more particularly, to a technique that can improve the visibility of the keys on a computer keyboard in such environments.

BACKGROUND OF THE INVENTION

Generally, on the key top of each key of a keyboard provided for a personal computer (PC) is denoted a character, symbol, or the like that defines the key. Such PCs are typically operated in well-lit environments such as offices or homes, so that users are not usually concerned about the visibility of the characters and symbols on the keys when they are operating the keyboards of those PCs.

However, when such a PC is used in a dimly-lit environment, like in a meeting room in which the lighting is limited so as to use a projector, for example, the user will come to realize the difficulty of discerning the characters and symbols on the key tops in such an environment.

In order to address this problem, there has been proposed and implemented in the past a method that provides, for example, a lap-top PC with an additional light source that lights up the keyboard. When using such a lap-top PC, a user will be able to reliably read the characters and symbols on the key tops despite the lack of ambient light.

A technique utilizing such an additional light source cannot prevent the manufacturing cost of the PC from an increase to be caused by the light source and the light source circuit provided for the PC. Laying the cables for the light source and the circuit also increases the workload for assembling the lap-top PC. In addition, it is difficult to locate the light source such that the lighting of the keyboard is even and free from shadows. Finally, such a light source adds to the weight and complexity of the lap-top PC.

Therefore, it is an object of the present invention to provide a computer that can significantly improve the visibility of the keyboard when it is being used in locations with little or no ambient light while avoiding the increases in manufacturing cost, complexity and weight and the problems of uneven lighting inherent in previous solutions. It is another object of the present invention to provide a key top for each key of a keyboard preferred for such a computer.

SUMMARY OF INVENTION

In order to attain these objects, a light accumulator is employed for the characters and symbols on each key top to avoid the problems associated with the more conventional solution of providing an external light source. More specifically, the character, symbol or the like is printed out with use of a light accumulator so that light energy is accumulated in the light accumulator while the key is being used in locations having sufficient ambient light. Thereby, when the key is used in a darkened environment, the light accumulator emits the character, symbol, or the like so that the user can recognize the character/symbol.

The method that prints out characters and symbols on key tops with use of such light accumulators is less expensive than the above-described conventional technique that provides a keyboard with a light source that lights up the keyboard. It also avoids any increase in the workload for assembling the lap-top PC. The light accumulating material adds no measurable weight to the PC and, finally, since the light is emitted from the light accumulator on the key top itself, there is no problem with uneven lighting or shadows.

One problem that arises when using light accumulating material on the key tops is providing a coating of light accumulator thick enough to provide a satisfactory emission performance. The emission performance means a measurement of the emission brightness after a light irradiation for light accumulation and/or a measurement of the emission brightness recognized in a predetermined time. The emission performance, when the light-accumulation coating is the same, is proportional to the thickness of the light accumulator per unit area. Consequently, as the light accumulator increases in thickness, the emission performance improves. At a sufficient thickness, the emission performance is satisfactory for continuous operation of the PC in a dark place.

Another problem that arises is that, sometimes, it is difficult to maintain emission performance from a light accumulator even when the thickness should be sufficient, since the light accumulator coating on the key top is worn out as the user operates the key. This is why it is no use to simply increase the thickness of the light accumulator on each key top so as to obtain necessary emission performance.

In order to solve the above-mentioned problems, the present invention proposes a method that forms a groove in each key top in accordance with the shape of the key's respective character or symbol and dispose a light accumulator in the groove at a thickness that can assure the predetermined emission performance necessary for satisfactory performance. Because the light accumulator is disposed in such a groove, the light accumulator is not worn out nor comes off even when the user continues the operation of the key. The shape of the groove for embedding the light accumulator therein such way can be varied. For example, it is possible to use the groove to form an area denoting a character/symbol or to place the groove along the frame of such an area for denoting the character/symbol. It is also possible to form a groove so as to surround such an area for denoting the character/symbol. According to the present invention, a groove formed in accordance with the shape of a character/symbol means a concept that includes all of these groove forming methods and any others whereby the groove with its applied light accumulator indicates to the use the identity of the key's respective character/symbol.

The computer of the present invention, which is composed on the basis of the above concept, is provided with a main body on which such a key to be operated by the user is disposed. The key on the main body has a body opened to the key operation surface and including a light accumulator recess formed in accordance with the shape of the key operation type and a light accumulator embedded in the light accumulator recess.

The computer of the present invention is enabled to decide a depth of the light accumulator recess by considering the residual light brightness of the light accumulator. Consequently, it is possible for the computer to use a light accumulator having a thickness enough to endure a long continuous use at a dark place. Considering the emission performance of each existing light accumulator, the depth of the light accumulator recess, that is, the thickness of the light accumulator itself should be at least 150 Fm and preferably at least 200 Fm.

On the other hand, this light accumulator, since it is embedded in the light accumulator recess, never comes off or comes off very slightly even when it comes off while the user operates the keyboard of the PC. Thus, there will never arise a problem that the user fails in recognition of the key operation type due to a lack of light accumulator or emission performance.

In the concept of the light accumulator disclosed above are included any of the well-known light-accumulator coatings such as photo-accumulating pigments, photo-accumulating inks, and other general materials having a photo-accumulating function respectively and any other photo-accumulating materials appropriate for this application, whether now-know or later-developed.

In the concept of the key mentioned above are included all the keys of the keyboard used to enter characters or symbols. Pointing devices such as track pads are also included in the concept of the key to be operated by the user according to the present invention. Consequently, a display that makes the user recognize the presence of a pointing device is considered to be equivalent to a display that corresponds to each operation type in the present invention.

A typical example of the key of the present invention is input keys disposed on a keyboard. On the key top of each of those input keys is denoted a character or symbol. Specifically, the user can identify the operation type of each of those input keys with the character or symbol denoted on the key top. And, as described above, the light accumulator recess can be formed in various ways. For example, a light accumulator recess can be formed in an area in which a predetermined character or symbol is denoted, as well as in an area that surrounds the area in which the predetermined character or symbol is denoted. In any of the ways, the user can recognize the character or symbol at the key top.

The computer of the present invention should preferably be provided with a residual emission level meter that displays a residual emission level of the light accumulator embedded in each light accumulator recess. This is to prevent the user from an accidental stop of the emission of the light accumulator during an operation at a dark place and assure continuation of a smooth operation for the user. This residual emission level meter can have a light accumulator as an element. It is still another object of the present invention to provide a computer that includes a meter for displaying such a residual emission level.

In order to achieve the above object, the computer of the present invention comprises a main body provided with a keyboard on which a plurality of input keys are disposed; a display unit that displays an image in accordance with an operation executed for the main body and enabled to be opened from/closed to the main body; and a display meter provided at the main body or display unit and composed of a plurality of light accumulating films that differ from each other in residual emission brightness in a predetermined way.

The display meter of the present invention is composed of a plurality of light accumulating films that differ from each another in residual emission brightness in a predetermined way as described above. Consequently, a time lapse can be known by comparing the residual emission brightness among the light accumulating films. For example, assume that a plurality of the light accumulating films are composed of the same light accumulator respectively. In this case, when the film thickness differs among those films, the residual emission brightness also differs among the films under a predetermined condition. Typically, when there are two light accumulating films and the emission from one light accumulating film stops in a predetermined time while the other light accumulating film keeps the emission. At this time, the user can know the lapse of the predetermined time by recognizing the emission of the other light accumulator film.

In the case where an input key has a character or symbol displayed by such a light accumulator on its key top, the display meter can be composed so as to display the residual emission level of the light accumulator that displays the character or symbol. For example, it is just required in this case that at least one of a plurality of light accumulating films is provided with a light accumulator that displays the character or symbol and the same emission performance as those of others under a predetermined condition. When a display meter is composed of two light accumulating films, the meter is composed so as to cause one light accumulating film to continue the emission while the other light accumulating film stops the emission in a predetermined time. In the case where the same emission performance is given to both of the light accumulating films, when one of the light accumulating films stops the emission, the user can recognize that the residual emission of the light accumulator that is displaying the character or symbol is also now at a low level.

The computer of the present invention may be a lap-top PC, of course. As known well, such a lap-top PC enables the display unit, which is typically a liquid crystal display, to be opened from/closed to the main body. And, the liquid crystal display is provided with a light source referred to as a back light unit. Part of the light supplied from the light source leaks from the screen of the liquid crystal display. The computer of the present invention can use this leaked light as a light energy source for the display meter or light accumulators used to display characters and symbols. More specifically, when the display meter denotes a low level of the residual emission of each light accumulator, the liquid crystal display may be closed, thereby supplying the leaked light to the display meter and/or each of the key-top light accumulators. In this case, when the liquid crystal display is closed, the lap-top PC must be set in a proper mode so as to continue the emission of the back light unit, of course. Also in this case, the screen of the liquid crystal display should preferably be white so as to enable more light energy to be supplied to the display meter and each light accumulator.

Furthermore, it is still another object of the present invention to provide a keyboard preferred for the above-described computer. The keyboard includes a plurality of operation keys disposed thereon. Each of those operation keys has a key body having a key top surface and a character/symbol display member recognized on the key top surface. The display member is composed of a light accumulator that can keep a residual emission brightness of at least 50 mcd/m2 for 30 minutes after the light accumulator is exposed to a 400-lux light from a D65 standard light source for 20 minutes. The display meter composed as described above can assure enough visibility for the characters/symbols during continuous operation of the lap-top PC in a dark place. Such a display meter composed of a light accumulator must be formed so as not to be protruded from the key top surface on the keyboard of the present invention. This is to prevent the light accumulator from coming off due to the operation of the user.

According to the present invention, such a conventional well-known measuring instrument as a spectral radiance meter can be used for measuring the residual emission brightness. While the values obtained for the aperture (solid angle), the measured distance, and the RGB filtering differ slightly among measuring instruments, any of the existing radiance meters can correct emission brightness values automatically. Measured emission brightness values will thus become identical among those radiance meters.

As described above, while the present invention provides a computer provided with a display meter composed of a light accumulator, this display meter may be independent of the computer. More specifically, the present invention provides a display meter provided with a first display member composed of a first light accumulator and a second display member composed of a second light accumulator, which is different from the first light accumulator in emission performance when measured at a predetermined time after a light is accumulated therein under the same condition as that of the first light accumulator.

This display meter enables a time lapse to be known as described above by observing whether the second display member maintains the emission at a predetermined time after light is accumulated in the member under the same condition as that of the first member while the emission from the first display member stops. For example, the display member can be used as a meter for displaying a residual emission level just like a residual battery level meter of a lap-top PC.

As described above, it is well known that a residual emission level differs among the thickness values of the light accumulators when the same material is used for those light accumulators. Consequently, in the case where the first and second light accumulators are made of the same material and composed so as to be different from each other in thickness, those first and second light accumulators can be combined into a display meter.

While a description has been made for only two (first and second) display members, this is because a display meter can be composed of a minimum of two display members. As to be described in the embodiment of the present invention, the display meter of the present invention may of course also be composed of more display members (the third, the fourth, . . . ).

BRIEF DESCRIPTION OF DRAWINGS

Hereafter, the present invention will be described in detail in accordance with the embodiment(s) shown in the accompanying drawings, in which.

DETAILED DESCRIPTION

Figure 1:
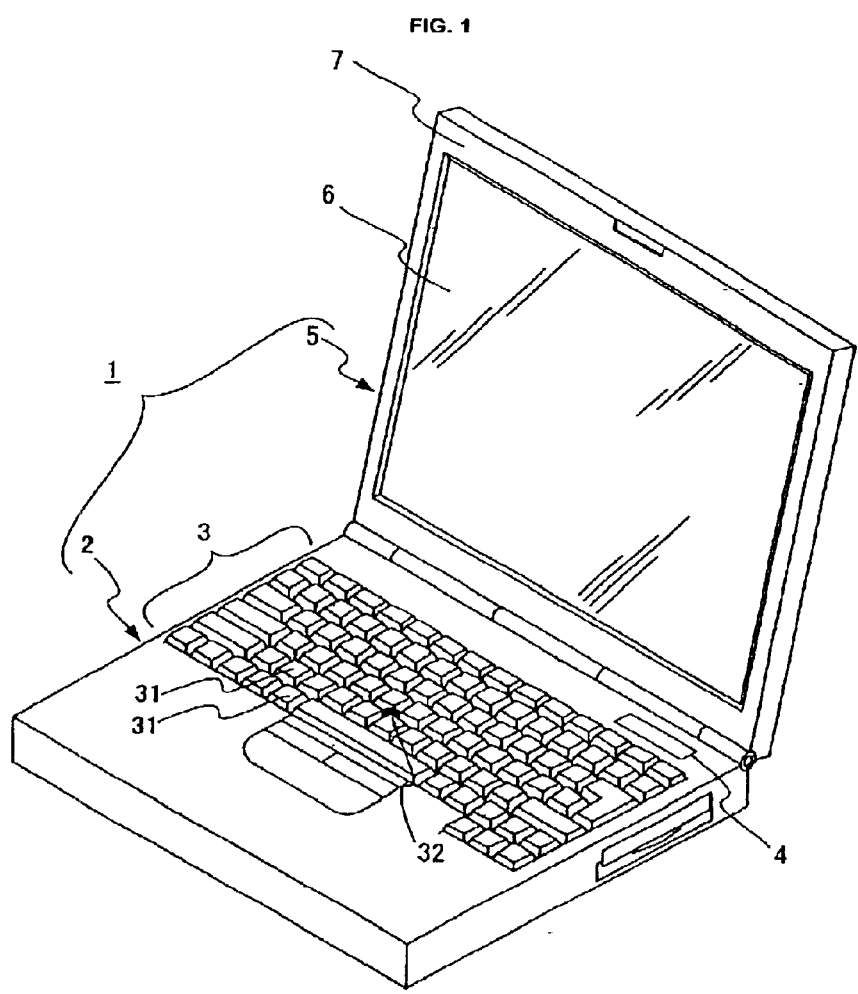
FIG. 1 is a perspective view of a lap-top PC in an embodiment of the present invention.

As shown in FIG. 1, the lap-top PC 1 is composed of a main body 2 and a liquid crystal display 5. The main body 2 and the liquid crystal display 5 are connected to each other by hinges (not shown) so that the liquid crystal display 5 can be opened from/closed to the main body 2.

The main body 2 is provided with a keyboard 3 used as input operation means. This keyboard 3 is composed of a plurality of keys 31 used to enter characters, symbols, etc., as well as to control various operations of the lap-top PC 1. On the keyboard 3 is also disposed a pointing device 32. The lap-top PC 1 may also include other types of pointing devices such as touch pads, joysticks, etc. (not shown). In the main body 2 is disposed a built-in battery (not shown) used to drive the lap-top PC 1. A residual emission level meter 4 is also disposed on the surface of the main body 2. This residual emission level meter 4 will be described in detail later.

The liquid crystal display 5 is provided with a liquid crystal display panel 6 used to display images and a frame 7 used as a housing for the liquid crystal display panel 6. The liquid crystal display panel 6 displays an image in accordance with each operation executed for the main body 2.

Figure 2A:
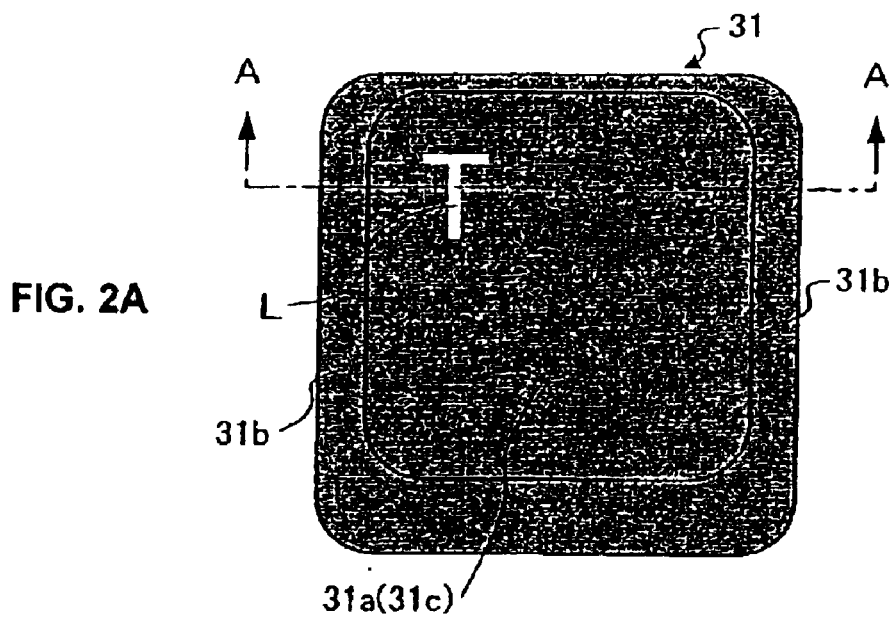
FIG. 2(a) is a top view of the structure of a key of the lap-top PC in an embodiment of the present invention.
Figure 2B:
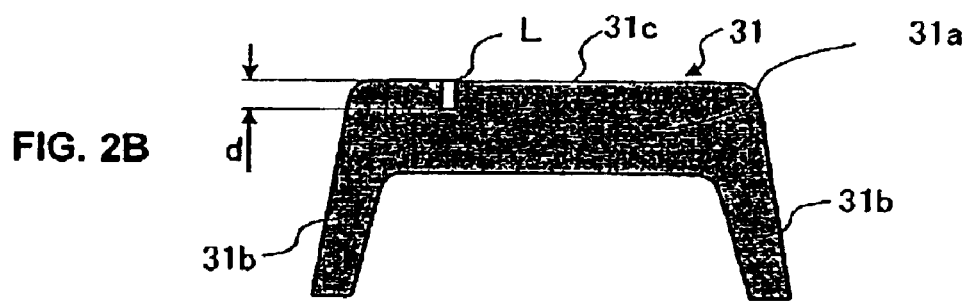
FIG. 2(b) is a cross sectional view of the structure of a key of the lap-top PC in an embodiment of the present invention, taken at the line A—A shown in FIG. 2(a)
Figure 2C:
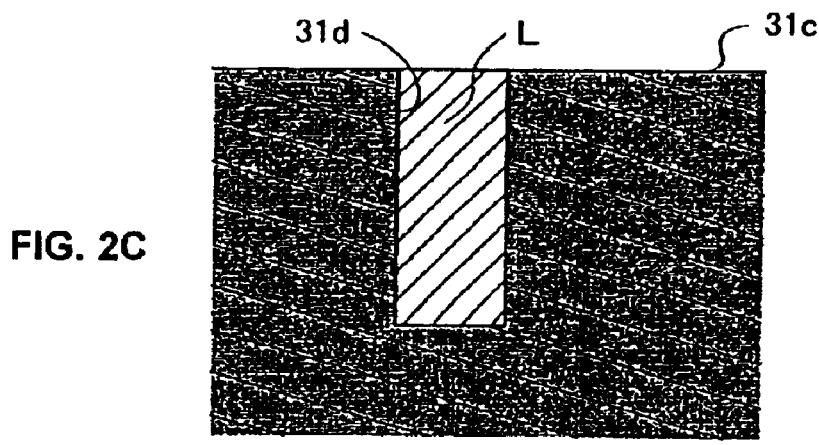
FIG. 2(c) is a partially expanded (zoomed) view of FIG. 2(b)

FIG. 2 shows the details of a key 31 of the keyboard 3. As shown in FIG. 2, the key 31 is composed of a ceiling part 31a having a predetermined thickness and a leg part 31b trailed from the ceiling part 31a. The surface of the ceiling part 31a forms a key top 31c to be pressed by the user. The key 31 shown in FIG. 2 denotes a character "T" on its key top 31c.

In the ceiling part 31a is formed a light accumulator recess 31d opened to the key top 31c. This light accumulator recess 31d has a groove formed in accordance with the character "T". The groove can be formed by, for example, a laser processing. The laser processing fuses the ceiling part 31a by means of a thermal fracture in accordance with the area denoting the character "T" to form a groove. Then, a light accumulator L is embedded in the groove-like light accumulator recess 31d. The light accumulator L should preferably be an aluminate one. This light accumulator L looks light whitish yellow at bright places.

As shown in FIG. 2, the keys 31 of the laptop PC 1 in this embodiment are black. On the other hand, because each light accumulator L is whitish yellow, the light accumulator L displays the character "T" in white at bright places. And, because the key 31 is black, the white "T" is visible enough even at bright places. On the other hand, for example, when the key 31 is white, the (white) color of the key 31 is similar to the color of the light accumulator L, so that it is not visible enough at bright places. Therefore, when the present invention employs such the whitish yellow light accumulator L, the color of the key 31 should be black or a dark color. However, because the light accumulator L can be colored with an added colorant or the like, there is no need to limit the color of the key 31 in such a case.

As described above, in the case of the lap-top PC 1, a light accumulator L displays the character "T" of the key 31. And, this is why the user can recognize the character "T" satisfactorily due to the emission of the light accumulator L even in a use at a dark place after a use in a light place.

Assume now that the lap-top PC 1 is used for a long time at a dark place. In this case, a problem arises from the residual emission level of the light accumulator L. The emission from the light accumulator L attenuates with time and the brightness in this attenuated state is referred to as a residual emission brightness. And, because the residual emission brightness is proportional to the thickness of the light accumulator L, the residual emission brightness must be considered so as to set a depth of the light accumulator recess 31d and an embedding depth of the light accumulator L.

Figure 3A:
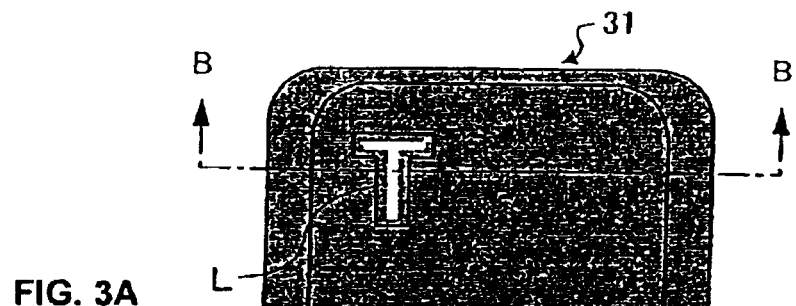
FIG. 3(a) is a top view of another structure of the key of the lap-top PC in the embodiment of the present invention.
Figure 3B:
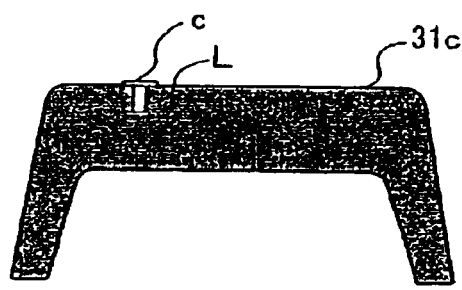
FIG. 3(b) is a cross sectional view of the key structure shown in FIG. 3(a), taken at the line B—B shown in FIG. 3(a)
Figure 3C:
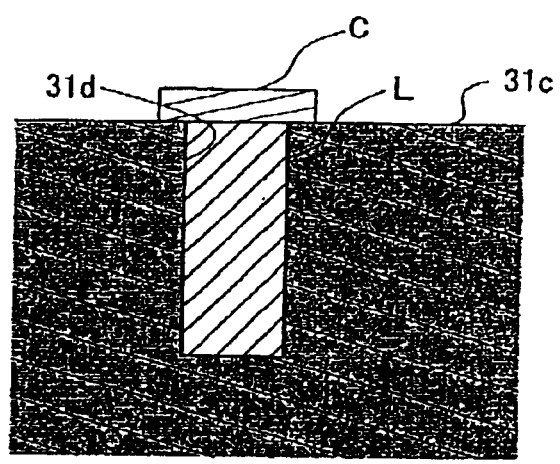
FIG. 3(c) is a partially expanded (zoomed) view of FIG. 3(b)

It has been found that a 400-lux light from a $D_{65}$ standard light source maintains a residual emission brightness of at least 50 mcd/m$^2$ 30 minutes after being exposed to the light for 20 minutes, and this is preferable for the use of the lap-top PC 1 at dark places. This is why it is important for the present invention to give consideration to this residual emission brightness to set a depth of the light accumulator recess 31d and an embedding depth (d in FIG. 2(b)) of the light accumulator L. And, in order to achieve this residual emission brightness, the (preferably) aluminate light accumulators L should be at least 150 μm deep, preferably at least 200 μm deep. Consequently, the depth of the light accumulator recess 31d and the thickness of the light accumulator L should be at least 150 μm, preferably at least 200 μm. For example, "N Nightglow (LumiNova)" of Nemoto & Co., Ltd. may be used as the light accumulator L. Or, instead of the light accumulator L, any of the well-known paints and inks that include a light accumulating pigment may be embedded in the light accumulator recess 31d. In order to secure a thickness of about 200 μm, the coating process may be divided into several processes. The depth of the light accumulator recess 31d and the embedding depth of the light accumulator L may not necessarily be the same; the depth of the light accumulator recess 31d may be deeper than the embedding depth of the light accumulator L. In this case, however, the embedding depth of the light accumulator L should be at least 150 μm, preferably at least 200 μm. While the embedding depth of the light accumulator L is not defined specifically in terms of the residual emission brightness, the depth should be determined by giving consideration to the required residual emission brightness. It should also be considered that, when the embedding depth of the light accumulator L is excessive, the manufacturing costs associated with the lap-top PC 1 increases. Also, the depth of the light accumulator recess 31d may be limited by the depth of the ceiling part 31a of the key 31. Finally, a transparent protective film C may be formed on the key top 31c so as to protect the light accumulator L as shown in FIG. 3.

Figure 7A:
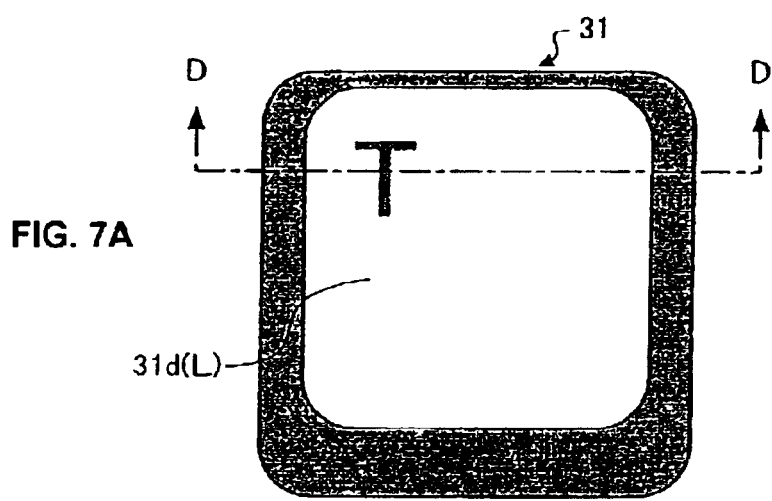
FIG. 7(a) is a top view of another structure of the key of the lap-top PC in an embodiment of the present invention.
Figure 7B:
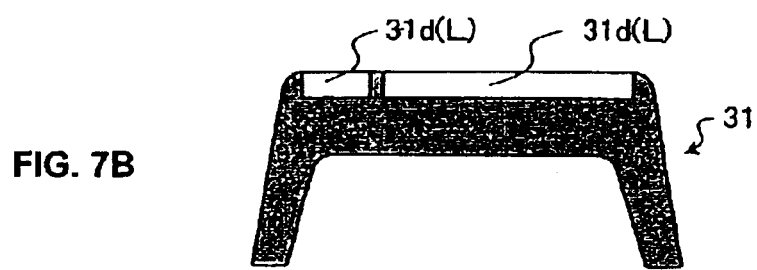
FIG. 7(b) is a cross sectional view of the key structure shown in FIG. 7(a), taken at the line D—D shown in FIG. 7(a)

While the area for displaying the character "T" is formed as a light accumulator recess 31d in the above embodiment, the area may also be formed as shown in FIG. 7. FIG. 7(a) shows a top view of the recess 31d and FIG. 7(b) shows a cross sectional view at the D—D line shown in FIG. 7(a). In the case of the key 31 shown in FIG. 7, a light accumulator recess 31d is formed in the key top except for the character "T" portion. Consequently, the light accumulator L comes to be disposed on the full surface of the key top 31c except for the "T" character portion. In this form, the character "T" portion takes the same color (black) as that of the key 31 and the rest surface of the key top 31c looks white at bright places, since a light accumulator L is disposed there. And, the black "T" comes up due to the emission from the light accumulator L.

Figure 8A:
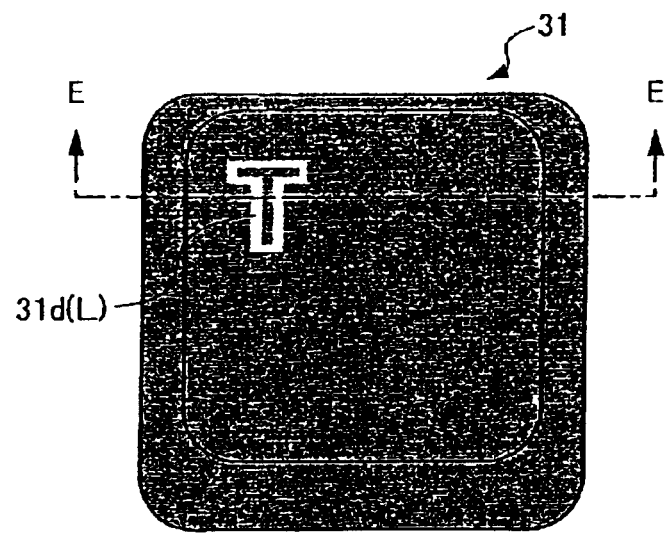
FIG. 8(a) is a top view of still another structure of the key of the lap-top PC in an embodiment of the present invention.
Figure 8B:
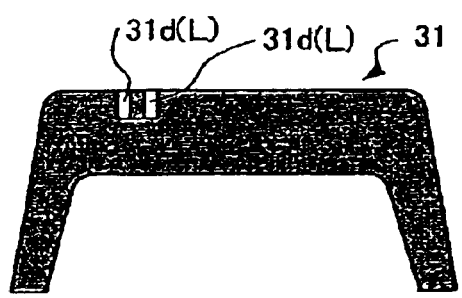
FIG. 8(b) is a cross sectional view of the key structure shown in FIG. 8(a), taken at the line E—E shown in FIG. 8(a)

The key 31 in the above embodiment may also be formed as shown in FIG. 8. FIG. 8(a) shows a top view of such the key 31 and FIG. 8(b) shows a cross sectional view at the E—E line shown in FIG. 8(a). In the case of the key 31 shown in FIG. 8, the light accumulator recess 31d is formed at a predetermined width around the portion for displaying the character "T". Consequently, a light accumulator L comes to be disposed at a predetermined width around the character "T". In this case, only the predetermined width around the character "T" looks white at bright places and the rest portion looks black. In other words, the character "T" is also displayed as an outline character. Thus, the character "T" is displayed as an outline character even at dark places due to the emission from the light accumulator L.

While a description has been made for a specific key 31 that displays the character "T" so far, the light accumulator recess 31d may also be formed for each of the rest of the keys 31 of the keyboard 3 in the same way so that a light accumulator L is embedded therein. It is also possible to form the light accumulator recesses 31d just for the keys 31 used frequently and embed those keys 31 therein, not for all the keys 31 of the keyboard 3. In other words, the method for forming the light accumulator recess 31d and embedding a light accumulator L therein may be employed for any of the keys 31 on the keyboard 3. In addition to those keys 31, the method may also be employed for the pointing device 32 so as to compose the device 32 and display an operation type thereof just like the key 31.

Figure 4A:
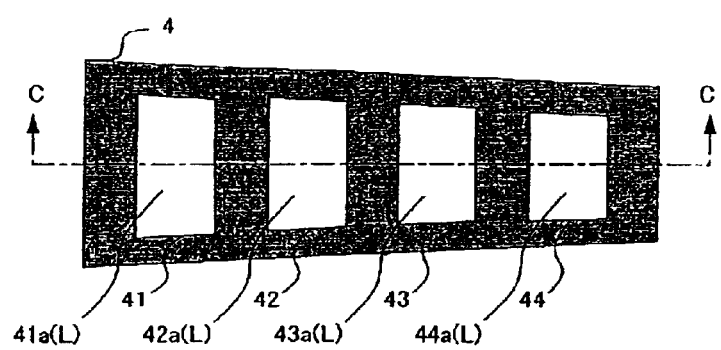
FIG. 4(a) is a top view of a structure of a residual emission level meter of the lap-top PC in an embodiment of the present invention.
Figure 4B:
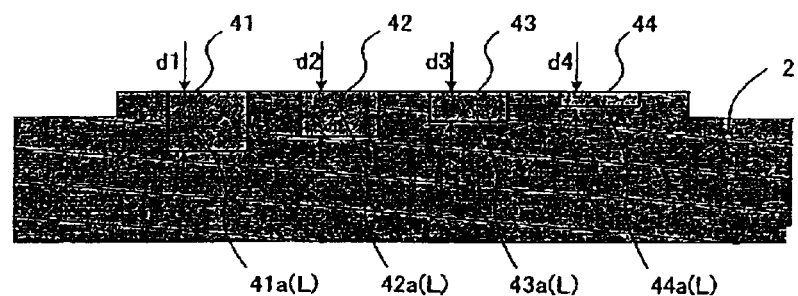
FIG. 4(b) is a cross sectional view of the residual emission meter shown in FIG. 4(a), taken at the line C—C shown in FIG. 4(a)

As shown in FIG. 4, the residual emission level meter 4 is provided with a function that notifies the user of a residual emission level of the light accumulator L of each key 31. The residual emission level meter 4 is composed of four display films 41 to 44. Basically, each of the display films 41 to 44 is identical to the above-described configuration that a light accumulator L is embedded in each of the light accumulator recesses 41a to 44a. However, the depth of each of the light accumulator recesses 41a to 44a, that is, each of the film thickness values d1 to d4, differs among the display films 41 to 44. As shown in FIG. 4, the film thickness among d1 to d4 takes a relationship of d1>d2>d3>d4.

Figure 5A:
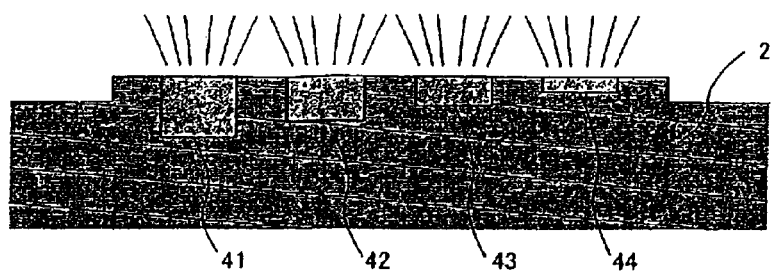
FIGS. 5(a) through (c) shows an emission state of each light accumulator L with respect to a time lapse of a residual emission level meter of the lap-top PC in an embodiment of the present invention, with the representation passing from (a) to (b) to (c) with respect to the passage of time.
Figure 5B:
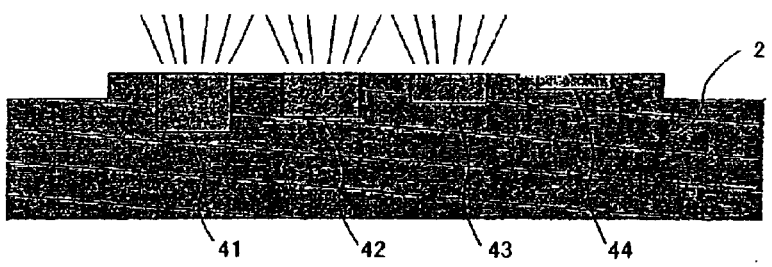
Figure 5C:
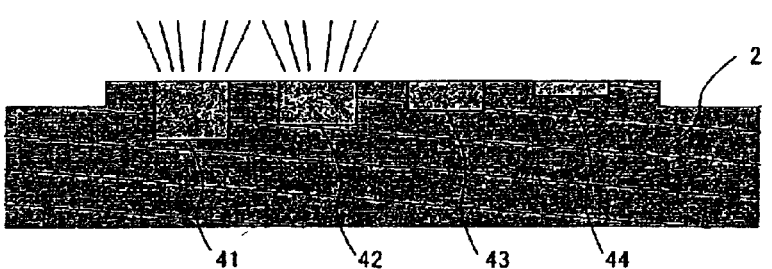

As described above, the residual emission brightness is proportional to the thicknesss of the light accumulator L. Consequently, when a light is accumulated in light accumulators L under the same condition, the residual emission brightness differs among display films 41 to 44 after a predetermined time lapse. More specifically, because the residual emission brightness after a predetermined time lapse differs among the thickness values of light accumulators L, the residual emission brightness among the display films 41 to 44 takes a relationship of d1>d2>d3>d4. Of course, it is natural that the residual emission brightness can be recognized by human eyes after a predetermined time lapse. Consequently, when the thickness of each light accumulator L is adjusted as needed, it is possible to configure the residual emission level meter 4 so that the light emission of each of the display films 44, 43, etc. stops sequentially over time. As shown in FIG. 5, the number of the display films decreases sequentially; for example, at first, the four display films 41 to 44 begin the emission (so as to be recognized by human eyes) (FIG. 5(a)), then only the three display films 41, 42, and 43 maintain the emission with time (FIG. 5(b)), and then only the two display films 41 and 42 maintain the emission (FIG. 5(c)).

Assume now that the thickness d1 of a light accumulator L in the display film 41 of the thickest light accumulator L matches with the thickness d of the light accumulator L of the above-described key 31 here. Then, when only the two display films 41 and 42 (or only the display film 41) maintain the emission as shown in FIG. 5(c), the user can recognize that the residual emission time of the light accumulator L in the key 31 has reached a low level. In the case where the thickness d of the light accumulator L of the key 31 is 200 $\mu$m, the depths d1 to d4 of the light accumulator recesses 41a to 44a may be decided as d1=200 $\mu$m, d2=150 $\mu$m, d3=100 $\mu$m, and d4=50 $\mu$m respectively. While four display films 41 to 44 are used in this example, differing numbers of display films may be employed in the residual emission level meter 4, as long as at least two display films are used.

Figure 9:
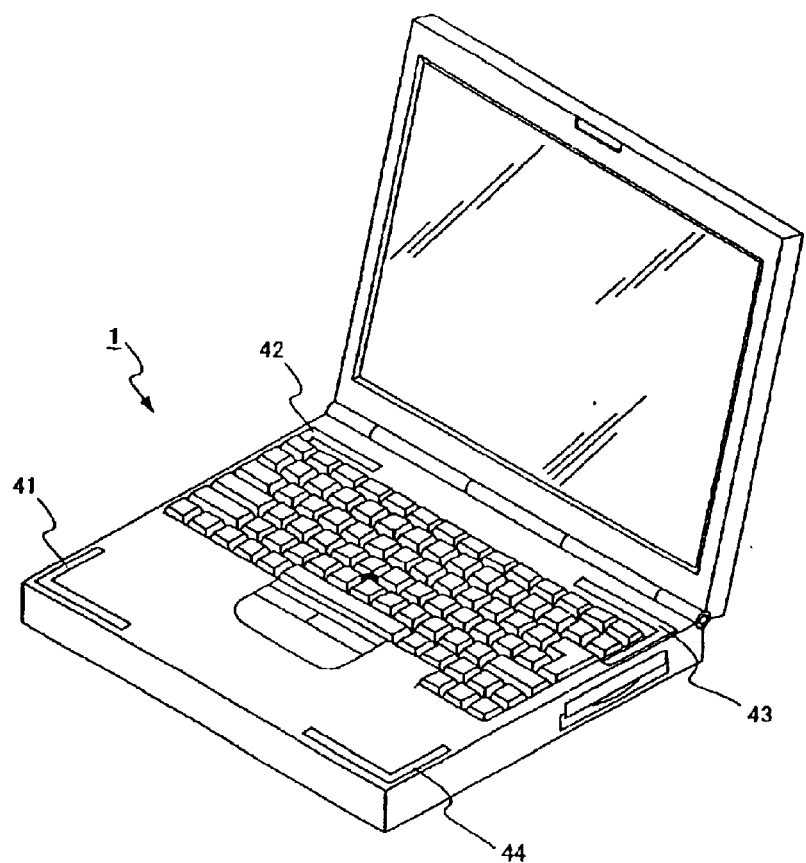
FIG. 9 is another example of the residual emission level meter of the lap-top PC in the embodiment of the present invention.

As described above, the residual emission level meter 4 functions so as to notify the user of a residual emission level of the light accumulator L of a key 31 in this embodiment. In other words, in this embodiment, the meter 4 is combined with a light accumulator L that displays the character "T". However, the residual emission level meter 4 may also be composed so as to realize another function independently. One of such the functions to be realized by the meter 4 is a clock function. The user can know a time lapse after the light accumulation from how many display films 41 to 44 are still emitting in the residual emission level meter 4. Specifically, in the case where the thickness d is decided so as to stop the emission from each of the display films 44, 43, 42, and 41 in response to each predetermined time lapse, it is possible to know a time lapse approximately according to how many display films of those 41 to 44 maintain their emission. Consequently, the present invention can also provide an independent embodiment of a meter provided with a plurality of display films (41 to 44). In the example shown in FIG. 4, the display films 41 to 44 are disposed adjacently while they may also be disposed differently. In the case where the user can recognize a plurality of display films 41 to 44 in the same visibility range, the user can also combine the display films so as to function as a residual emission level meter 4 or as a clock. For example, as shown in FIG. 9, it is possible to dispose the four display films 41 to 44 around the main body 2 of the lap-top PC 1. The configuration of each of those display films 41 to 44 is the same as each of those shown in FIG. 4 in this case.

Sometimes, the user, when using the lap-top PC 1 at a dark place, is required to accumulate a light in the light accumulators L during the operation. The user can charge a light in those accumulators L by exposing them to a light energy from a sunlight, lighting, etc. The present invention, however, proposes another method that a light energy is supplied to the light accumulators L from the liquid crystal display 5 of the lap-top PC 1 as described above in this embodiment. Hereinafter, this proposal of the present invention will be described with reference to FIG. 6.

As known well, the liquid crystal display 5 has a back light (not shown in FIG. 1) used as a sheet-like light source for lighting. The back light is disposed at the rear side of the liquid crystal display panel 6 and composed so as to irradiate a uniform light all over the liquid crystal screen having a predetermined expanse, thereby visualizing images on the surface of the liquid crystal display panel 6. In other words, a light emitted from the back light leaks from the surface of the liquid crystal display panel 6. And, this leaked light is accumulated in the light accumulators L.

Figure 6:
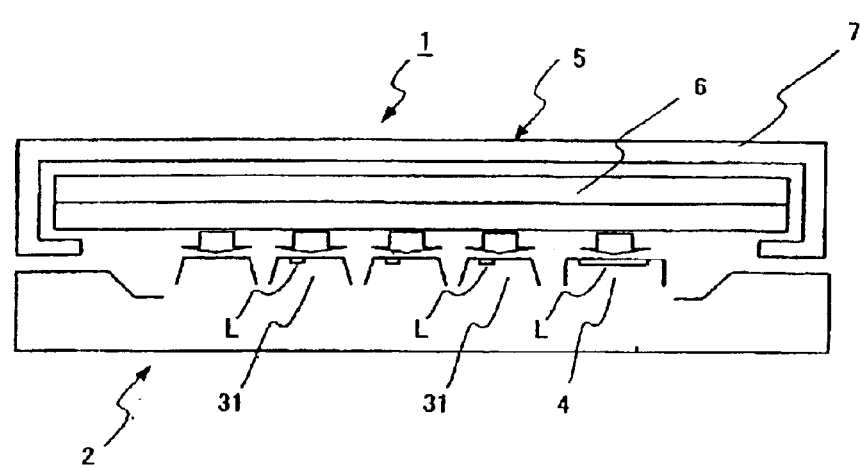
FIG. 6 shows how a light is accumulated in a light accumulator L in the lap-top PC in an embodiment of the present invention.

For this purpose, the lap-top PC 1 is "closed" as shown in FIG. 6. Then, the liquid crystal display panel 6, the keys 31, and the residual emission level meter 4 each another. Consequently, a leaked light (shown with an arrow) from the liquid crystal display panel 6 supplies a light energy to the light accumulators L existing in the keys 31 and in the residual emission level meter 4 provided on the main body 2, thereby the light is accumulated in those light accumulators L respectively.

At this time, the mode of the lap-top PC 1 must be set properly so as to continue the emission from the back light of the liquid crystal display 5 after the lap-top PC 1 is closed. And, in order to increase the leaked light from the liquid crystal display panel 6 at this time, the display image of the panel 6 is preferably configured to be primarily white.

The method shown in FIG. 6 has an advantage that there is no need to move the lap-top PC 1 to another place nor use a light source so as to supply a light to the light accumulators L. The method can also cope with a case in which no room light for charging the light accumulators L is available due to circumstances. While the lap-top PC 1 is "closed", the liquid crystal display panel 6 comes very close to the keys 31 and the residual emission level meter 4 respectively, so that a strong light energy can be supplied to those light accumulators L. The light accumulating method recommended in this embodiment can thus have many advantages. In other words, the lap-top PC 1 in which the light accumulators L are disposed on the surface of the main body 2 that faces the liquid crystal display panel 6 when the lap-top PC 1 is closed will be a favorable apparatus from the viewpoint of light accumulation.

What is claimed is:

1. A computer, comprising:
   a main body provided with at least one key operated by a user;
   a display unit that displays an image in accordance with an operation executed by said main body;
   wherein said at least one key comprises:
   a top surface having a light accumulator recess formed therein, the shape of said recess being indicative of an operation type of said at least one key; and
   a light accumulator embedded in said light accumulator recess.

2. The computer according to claim 1;
   wherein a depth of said light accumulator recess is selected to provide a predetermined residual emission brightness of said light accumulator.

3. The computer according to claim 1;
   wherein said light accumulator recess is at least 150 $\mu$m in depth.

4. The computer according to claim 1;
   wherein said light accumulator recess is at least 200 $\mu$m in depth.

5. The computer according to claim 1;
   wherein said operation type of said at least one key is identified by a predetermined character or symbol; and
   said light accumulator recess is formed in the shape of said predetermined character or symbol.

6. The computer according to claim 1;
wherein said operation type of said at least one key is identified by a predetermined character or symbol; and
said light accumulator recess is formed to surround the shape of said predetermined character or symbol.

7. The computer according to claim 1;
wherein said operation type of said at least one key is identified by a predetermined character or symbol; and
said light accumulator recess is formed to cover said top surface of said at least one key except for an area in the shape of said predetermined character or symbol.

8. The computer according to claim 1;
wherein said computer further comprises a residual emission level meter having a light accumulator as an element and enabled to display a residual emission level of said light accumulator embedded in said light accumulator recess.

9. A computer, comprising:
a main body provided with a keyboard on which a plurality of input keys are disposed;
a display unit that displays an image in accordance with an operation executed for said main body and enabled to be opened from/closed to said main body; and
a display meter provided at said main body or said display unit and composed of a plurality of light accumulator films that are different from each other in residual light brightness in a predetermined way.

10. The computer according to claim 9;
wherein said plurality of said light accumulator films are composed of light accumulators with the same emission performance but with differing film thicknesses, thereby providing differing residual light brightnesses in a predetermined way.

11. The computer according to claim 9;
wherein each of said plurality of said input keys has a character or symbol displayed by a light accumulator embedded in its key top; and
said display meter is composed so as to display a residual emission level of said light accumulator that displays said character or symbol.

12. The computer according to claim 9;
wherein at least one of said plurality of said light accumulator films has the same emission performance as that of said light accumulator that displays said character or symbol.

13. A keyboard on which a plurality of operation keys are disposed;
wherein each of said plurality of operation keys comprising:
a key body having a key top surface; and
a display member of a character or symbol on said key top surface;
wherein said display member is comprised of a light accumulator that has a residual emission brightness of at least 50 mcd/m$^2$ 30 minutes after said light accumulator is exposed to a 400-lux light from a $D_{65}$ standard light source for 20 minutes.

14. The keyboard according to claim 13;
wherein said display member is not protruded from said key top surface.

15. In a computer having (i) a main body provided with a keyboard on which a plurality of input keys are disposed and (ii) a display unit for displaying an image in accordance with an operation executed for said main body and enabled to be opened from/closed to said main body, a method for illuminating said plurality of input keys for use in a location lacking in ambient light, the method comprising:
forming a light accumulator recess in a top surface of each of said plurality of input keys, the shape of said recess being indicative of an operation type of said each of said plurality of input keys;
depositing a light accumulating material in each said light accumulator recess;
charging said light accumulating material in each said light accumulator recess by exposing each of said plurality of input keys to an external light source.

16. The method according to claim 15 wherein each said light accumulator recess is formed to a depth of at least 150 µm.

17. The method according to claim 15 wherein each said light accumulator recess is formed to a depth of at past 200 µm.

18. The method according to claim 15 wherein said display unit comprises a back-light light source and wherein the step of charging said light accumulating material comprises closing said display unit to said main body such that light from said back-light light source impacts on said plurality of input keys.

* * * * *